May 29, 1951  S. A. SLAUSON  2,554,646
MEAT TENDERIZER
Filed Feb. 5, 1948
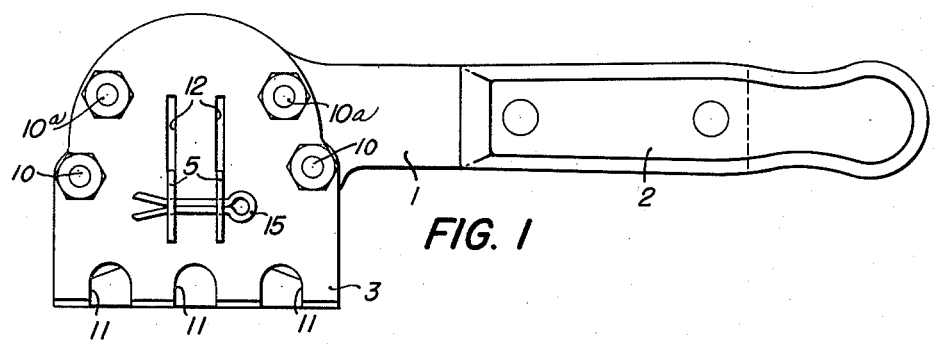
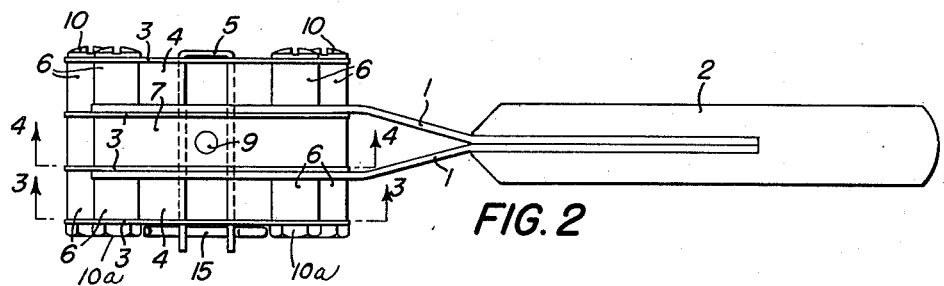
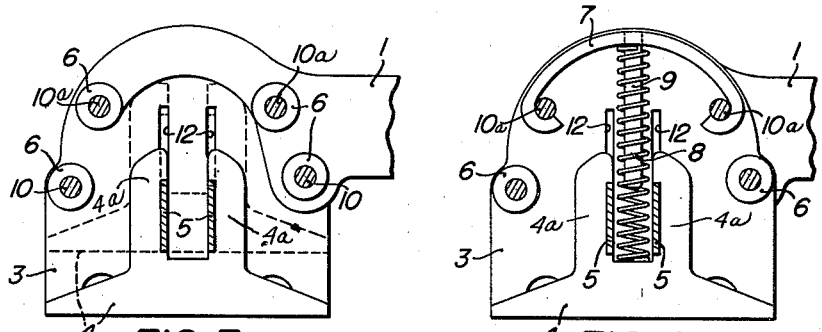
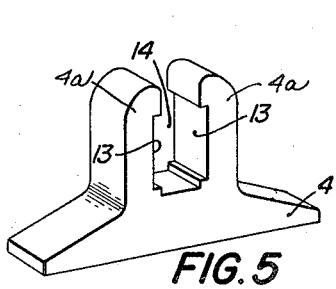
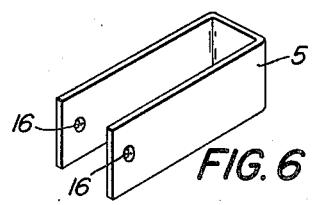
INVENTOR.
S. A. SLAUSON
BY
Merrill M. Blackburn
ATTORNEY Patented May 29, 1951

2,554,646

UNITED STATES PATENT OFFICE 2,554,646

MEAT TENDERIZER

Stephen A. Slauson, Cedar Rapids, Iowa

Application February 5, 1948, Serial No. 6,421

2 Claims. (Cl. 17—30)

My present invention relates to apparatus, sometimes called a steak machine, for tenderizing meat and comprises, among its objects, improvements in previously existing structures for this purpose, the provision of improved means for stripping meat from the cutting blades of a meat tenderizing machine; the provision of improved means for holding in line the meat strippers of a tenderizer; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 is a side elevation of a machine embodying my present invention;

Fig. 2 is a plan view of the structure shown in Fig. 1;

Fig. 3 represents a section taken along the plane indicated by the line 3—3, Fig. 2;

Fig. 4 represents a section taken along the plane indicated by the line 4—4, Fig. 2;

Fig. 5 is a perspective view of one of the strippers; and

Fig. 6 is a perspective view of a stripper connector and guide.

Reference will now be made in greater detail to the annexed drawings for a more complete description of this invention. A pair of supports 1 are connected to the handle 2 and constitute an extension thereof to which the head is connected and by which it is manipulated. The head comprises a plurality of cutting plates or blades 3, a plurality of T-shaped blocks serving as ejectors or strippers 4, a U-shaped connector 5, spacer blocks 6 and 7, spring means 8, a guide pin 9, and connecting bolts 10 and 10a.

As shown in Fig. 1, the cutting edge of the blades is sharpened and provided with notches 11. Each blade is provided with a pair of slots 12 through which the connector or key means 5 extends. The arms of this connector pass through openings or notches 13 in the legs 4a of the stripper members 4 and, by engaging the tops and bottoms of these notches, serve to keep the faces of the heads of the ejectors or strippers in alignment. The spacer blocks 6 are located between the blades 3 and serve to hold them a fixed distance apart. The bolts 10, passing through the blades 3 and blocks 6, hold the blades tightly against the blocks. The block 7 is in the form of a bent plate which acts as a bridge between the upper bolts 10a and serves to support the pin 9 which passes through the bridge 7 and is riveted to hold it in place therein. The spring 8 is seated at one end against the bottom of the notch or socket 14. It thus serves to push the middle stripper down and, with this, the side strippers, because of the fact that all of the strippers are connected by the connector 5. The pin 9 extends into the spring 8 and serves to hold this in line as the strippers are pushed upwardly during the tenderizing operation.

A cotter key 15 is passed through the holes 16 in the ends of the connector 5 and holds this in place. However, this key 15 is easily removed when disassembling of the tenderizer is desired. With the key 15 removed, it is easy to pull the connector 5 out and this will release all of the strippers so they may be removed for cleaning, when this is needed. For reassembly, the operation is reversed. The cutting edges of the blades 3 may be readily sharpened, if the strippers are first removed, in event such sharpening is needed.

The use of a tenderizer of the present type is sufficiently understood that no description thereof is deemed necessary.

It will of course be understood that the specific description of structure set forth above may be departed from without departing from the spirit of this invention as disclosed herein and as defined by the appended claims.

Having now described my invention, I claim:

1. A steak machine having a handle with supporting means adjacent one end thereof, bolts passing through said supporting means, spaced blades mounted on said bolts, a bridge in the upper part of the machine between two blades and connecting two of the bolts, a pin projecting inwardly from said bridge, said blades having one edge sharpened and provided with notches, stripper members located between adjacent blades and fitting closely between them but slidable with relation thereto, said blades having approximately centrally located slots, aligned with slots in adjacent blades, key means extending through the aligned slots in the blades and slidable longitudinally thereof, said stripper members having openings therein aligned with the slots in the blades and having the key means passed therethrough and holding the stripper members in approximate alignment, transversely of the machine, and spring means acting upon said stripper members to cause them to strip from the blades any meat adhering thereto during the use of the machine, at least one of said stripper members having a socket located centrally thereof for the reception of said spring means.

2. A meat tenderizer comprising, in combination, a plurality of substantially parallel blades having one edge notched and sharpened, spacing means holding the blades spaced a definite distance apart, bolts passing through the blades and the spacing means, one of the spacing means constituting a bridge connecting two of said bolts, a handle connected to the blades, stripper members between adjacent blades and serving to strip meat from the blades when in use, the blades having aligned slots extending vertically thereof when in position of use, holding means for the stripper members extending therethrough and through said blade slots, said holding means being slidable in the slots and holding the stripper members in substantial alignment when moved, a pin extending downwardly from said bridge between two of said blades, one of said stripper members having a socket into which said pin extends, and a spring surrounding said pin and located in said socket, said spring pressing at one end against said bridge and at its other end against the stripper member to cause the connected strippers to be actuated in the direction of the edges of the blades.

STEPHEN A. SLAUSON.

REFERENCES CITED

The following references are of record in the file of this patent:

UNITED STATES PATENTS

| Number | Name | Date |
| --- | --- | --- |
| 456,670 | Fugate | July 28, 1891 |
| 1,421,458 | Gregory | July 4, 1922 |
| 2,140,160 | Little | Dec. 13, 1938 |
| 2,392,036 | Fleming | Jan. 1, 1946 |
| 2,495,989 | Slauson | Jan. 31, 1950 |